United States Patent [19]

Copolillo

[11] Patent Number: 5,291,348
[45] Date of Patent: Mar. 1, 1994

[54] HIGH DENSITY SERVO TRACKING

[75] Inventor: Clement R. Copolillo, Oxnard, Calif.

[73] Assignee: Wangtek, Inc., Simi Valley, Calif.

[21] Appl. No.: 870,012

[22] Filed: Apr. 15, 1992

[51] Int. Cl.$^5$ ............................................. G11B 5/596
[52] U.S. Cl. ................................ 360/77.07; 360/77.12
[58] Field of Search ............... 360/77.01, 77.07, 77.12, 360/78.02

[56] References Cited

U.S. PATENT DOCUMENTS 4,975,791 12/1990 Eggebeen ........................ 360/77.12
5,055,951 10/1991 Behr .

Primary Examiner—Edward K. Look
Assistant Examiner—Christopher Verdier
Attorney, Agent, or Firm—Robbins, Berliner & Carson

[57] ABSTRACT

A technique for operating a data storage medium, such as a magnetic tape cartridge, by writing pairs of buried servo data tracks having alternating flux densities. A servo read gap is used to locate the on-track position at the border between a pair of servo tracks by detecting a fixed relationship, such as a predetermined proportionality correction factor, between the signals read from each track. Information data read and write gaps are mounted to the servo read head to create a plurality of information data tracks, each one half or less the width of a servo data track or smaller and separated from the next track by one half the servo track width. Information data tracks are formed in these separations between tracks by positioning a second servo data read head at a distance equal to the width of an information data track pitch from the first servo read head while using the second servo read head to locate the on-track position. The flux density transitions in the servo data tracks are at a substantial azimuth angle, such as 45°, from the direction of motion of the tape to minimize interaction between the servo data and the information data.

11 Claims, 4 Drawing Sheets

HIGH DENSITY SERVO TRACKING

BACKGROUND OF THE INVENTION

1. Field of the Invention

This invention relates generally to techniques for maintaining the position of read/write heads in alignment with tracks of data stored in magnetic media, such as magnetic tape cartridges.

2. Description of the Prior Art

There are many known techniques for maintaining alignment between read/write heads and data tracks stored in magnetic media. One well known conventional technique is commonly called the "buried servo" approach in which data in an underlying magnetic layer having a higher coercivity coating is detected by the read/write head to determine its position with respect to the data track. The servo data in the underlying or buried servo layer typically includes low density, long wavelength data in the form of flux transitions which are not overwritten during the recording or retrieval of data in the upper or information data layer. The timing and the detection of the servo data flux transitions relative to some known reference provides sufficient position information to permit head position corrections to be made by minimizing timing and/or phase errors. Selective filtering is used to discern the servo data in the underlying buried servo track layer from the upper layer read data.

Another well known technique is called the burst or embedded servo approach in which bursts of fixed density flux transitions are located in dedicated or unused gaps which overlap the track centerline to create a pair of distinguishable signals, called the A and B signals, above and below the track centerline, respectively. When the read head tracks the centerline exactly, the A and B signals have equal magnitude. If the head is off-track, the polarity and magnitude of the difference between the A and B signals provides an error signal which can be used to reposition the head.

What is needed is a head positioning technique that doesn't require the use of valuable surface area for servo data, that easily separates servo from information data, and that provides the necessary signals with the required quality to the servo circuitry for accurate head positioning.

SUMMARY OF THE INVENTION

The preceding and other shortcomings of prior art systems are addressed and overcome by the present invention that combines the benefits of the buried servo technique to maximize data storage capacity with an azimuth error technique to separate servo data from information data thus avoiding bandwidth restrictions between servo and information data. This technique provides A and B signals for magnitude and direction of off-track error.

In a first aspect, the present invention provides a method of operating data storage media by writing a plurality of pairs of tracks of servo data in a buried or lower layer of the storage media, each track containing different servo data than the other track of the pair, positioning a first servo data read head at an on-track location at which there is a predetermined relationship between the servo data simultaneously read from each track of the pair, and creating and/or reading an information data track in a second surface or top layer of the storage media with an information data read/write head positioned in accordance with the on-track location.

Servo and information data are separated from each other in accordance with the loss in signal strength caused by the azimuth angle between the read head and the written flux transition. The read head output voltage is equal to $\sin(x)/(x)$ where x is a function of the product of the track width and the tangent of the azimuth angle between the read gap and the recorded signal, all divided by the wavelength of the recorded signal. The amplitude of the read gap voltage falls off very quickly for high density recording so that the cosine error of the azimuth angle is negligible.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT(S)

Figure 1:
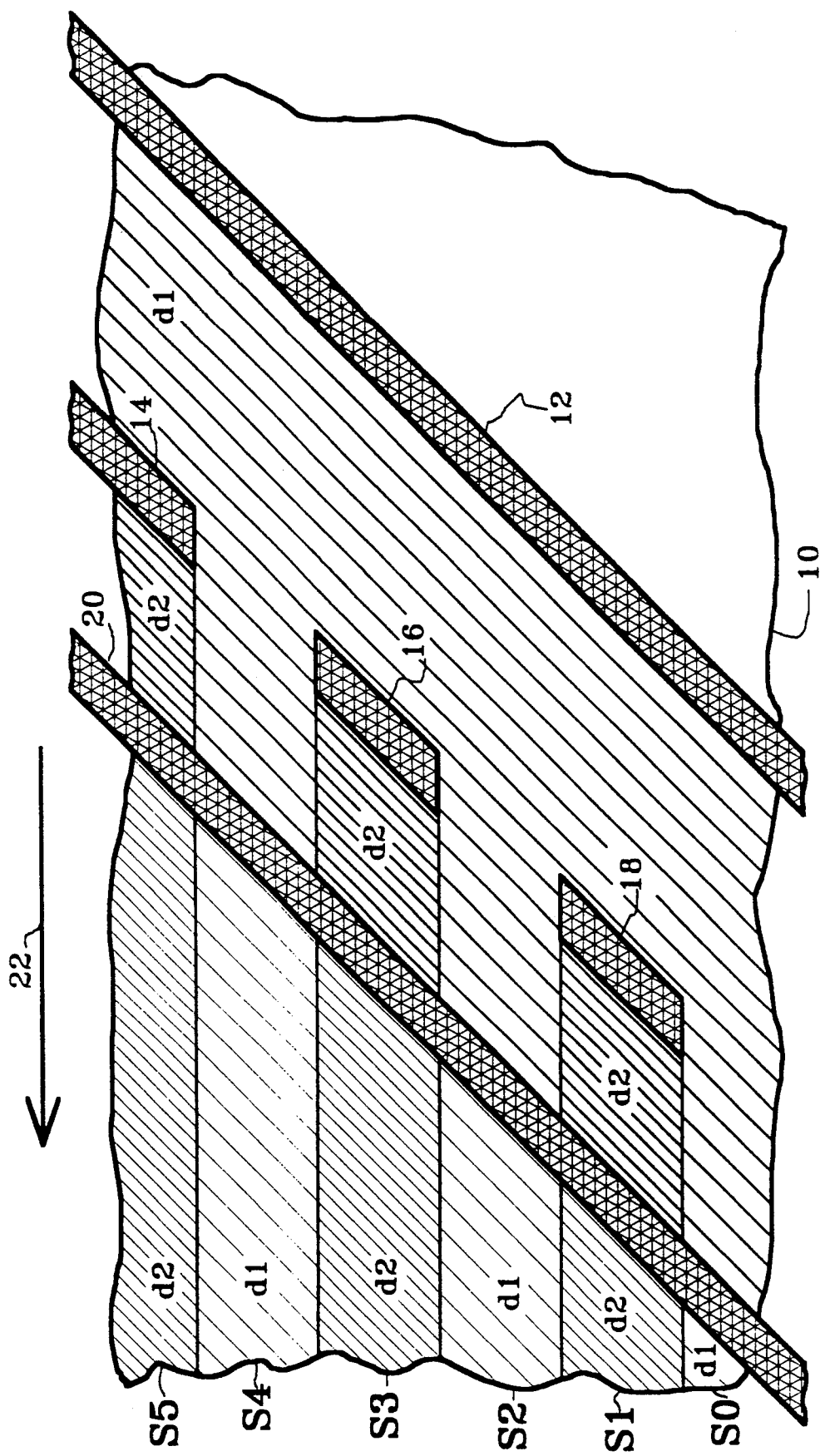
FIG. 1 is a graphical representation of a portion of magnetic tape being formatted with buried servo tracks in accordance with the present invention.

FIG. 1 is a graphical representation of magnetic tape portion 10 being formatted in a servowrite mode with buried servo tracks by full width servo gap 12, alternate servo track gaps 14, 16, and 18 and full width erase gap 20 in accordance with the present invention. As shown in this Figure, magnetic tape portion 10 is moving from right to left, as indicated by forward direction arrow 22. The portion of magnetic tape portion 10 to the right of full width servo gap 12 is assumed to be unformatted, that is, without servo tracks although any previously written magnetic servo or information data on magnetic tape portion 10, if it exists, will be overwritten by the servowrite process.

Magnetic tape portion 10 is a portion of a two layer magnetic tape or other media which may be used in a process similar to conventional buried servo read/write head positioning in that servo tracks are written on an underlying layer, typically having a substantially higher coercivity than the upper layer. The upper layer may then be erased, written with data, and read, without changing or overwriting the servo data on the buried servo tracks.

In accordance with the present invention, the servowrite process requires the operation of two sets of parallel servowrite gaps. Full width servo gap 12 is driven at predetermined frequency f1 to apply a first flux density d1 across the entire tape portion of interest.

Full width servo gap 12 is intentionally aligned at an angle of 45°, which may be considered an azimuth angle, relative to the direction of motion of magnetic tape portion 10, as indicated by forward direction arrow 22. Other azimuth angles, that is, angles between the servo data tracks and the information data, may be used but an azimuth angle of 45° is used in the presently preferred embodiment. As will be seen below, the information data will be written perpendicular to the direction of motion of magnetic tape portion 10 so the angle of the servo track data written by full width servo gap 12 also happens to be 45 with the direction of travel. As described below with reference to FIGS. 2A and 2B, the information and servo data is read by read gaps positioned in parallel with each set of data so that the read gaps are also aligned at 45° from each other. In this manner, the information data stored on the upper layer of magnetic tape portion 10 is automatically distinguished from the servo data stored in the servo tracks in the underlying layer because of the known insensitivity of a read gap to data at a substantial azimuth angle therefrom.

Figure 3:
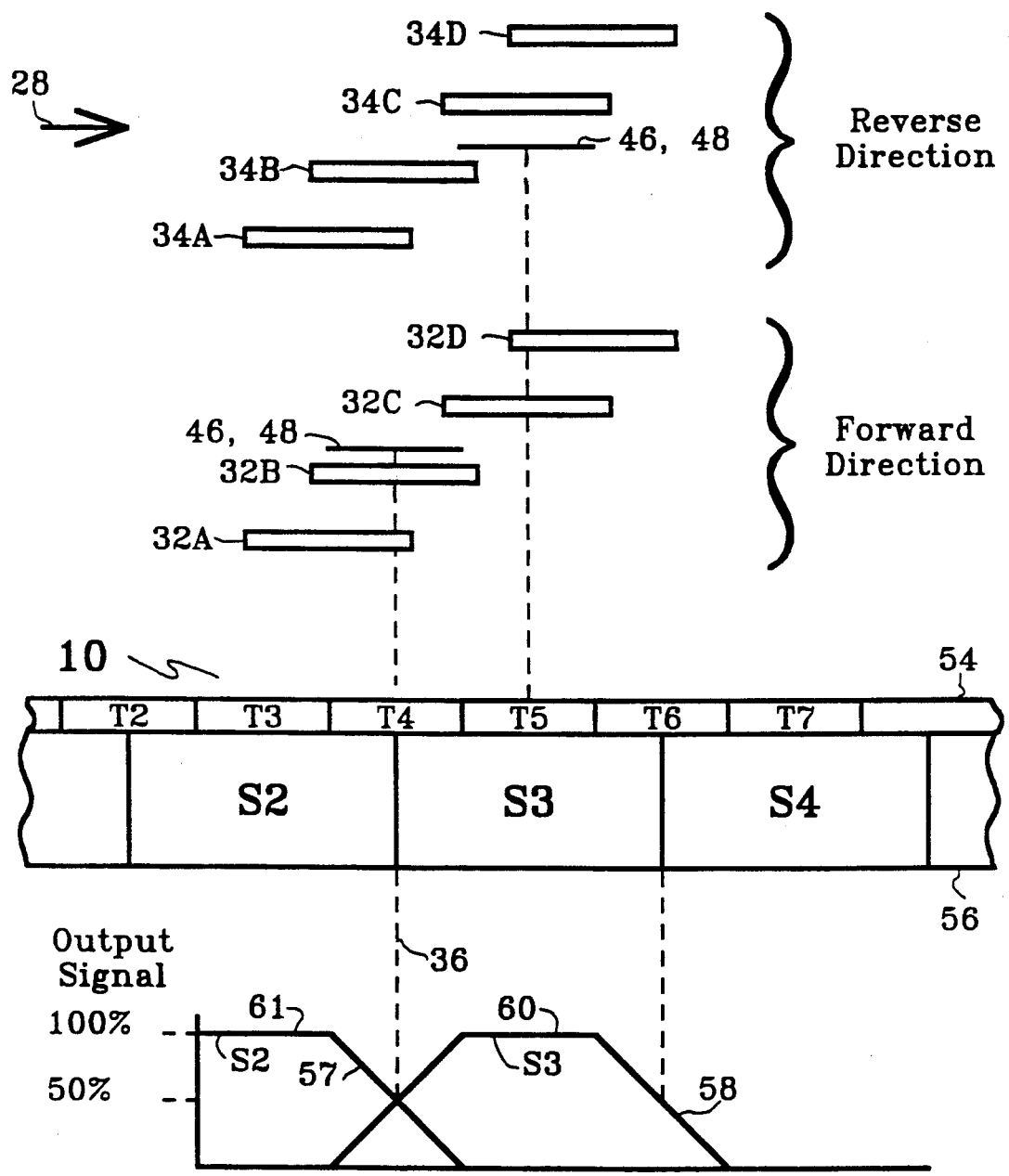
FIG. 3 is an illustration of the relationship between the servo signal output from the servo read gaps at different on-and off-track locations and the servo and information data track configuration of the magnetic tape.

Referring again to the servowrite formatting process depicted in FIG. 1, the section of magnetic tape portion 10 which has moved past full width servo gap 12 has been written, on both surface and underlying magnetic layers, with flux density d1. These layers are depicted in FIG. 3 as upper information data layer 54 and underlying or buried servo layer 56. After moving past alternate servo track gaps 14, 16, and 18 each driven at a second frequency f2, the portion of magnetic tape portion 10 passing under each of these track gaps has been overwritten by flux density d2 on both layers. After passing under full width erase gap 20, upper layer information data layer 54 is erased so that it may be later written with data, but the servo data on higher coercivity underlying layer 56 is not erased.

In this manner, servo tracks S0 through S5 are written on buried servo layer 56 during the servowrite process so that servo tracks S1, S3, and S5 which passed under both full width servo gap 12 and one of the alternate servo track gaps 14, 16, and 18 have been written with flux density d2 while servo tracks S0, S2, and S4 which passed only under full width servo gap 12 are written with flux density d1. Thereafter, upper information data layer 54 has been erased to prepare for the later application of information data.

The servowrite formatting process therefore prepares magnetic tape portion 10 with servo data track pairs of alternating flux densities d1 and d2. The tape is written with an appropriate number of servo track pairs to meet the required design goals. The distance between alternate servo track gaps 14, 16, and 18 is equal to the width of the gaps, so that the alternating tracks of servo data are of equal width. The gaplines of full width servo gap 12 and alternate servo track gaps 14, 16, and 18 are conveniently made parallel and, as noted above, aligned at 45° to the direction of tape travel as indicated by forward direction arrow 22.

It may be convenient to eliminate full width erase gap 20 and operate the servowrite procedure as a two step process where the servo tracks are first written on both layers of magnetic tape portion 10 during motion in the direction of forward direction arrow 22. Thereafter, magnetic tape portion 10 would be moved in the opposite direction and alternate servo track gaps 14, 16, and 18 turned off. Full width servo gap 12 may then be operated at a lower power level to erase only the upper layer of magnetic tape portion 10 while also rewinding the tape.

Figure 2A:
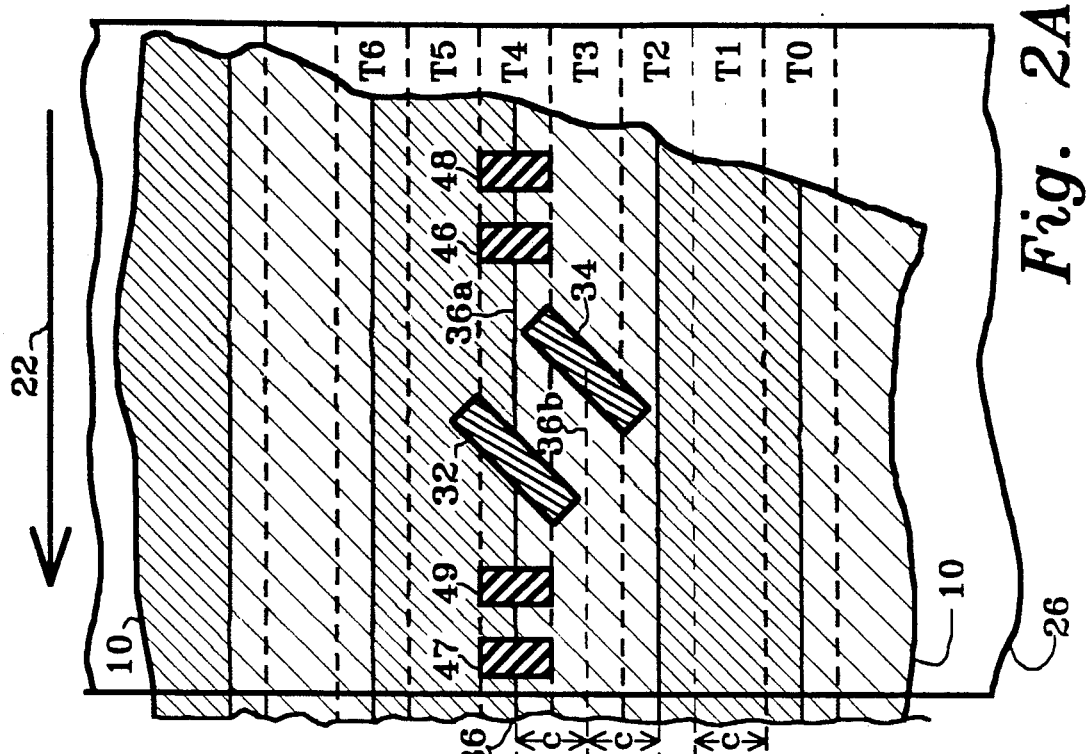
FIGS. 2A and 2B are graphical representations of the relative positions of the servo and information data tracks and the various read/write gaps in the forward and reverse tape directions respectively.
Figure 2B:
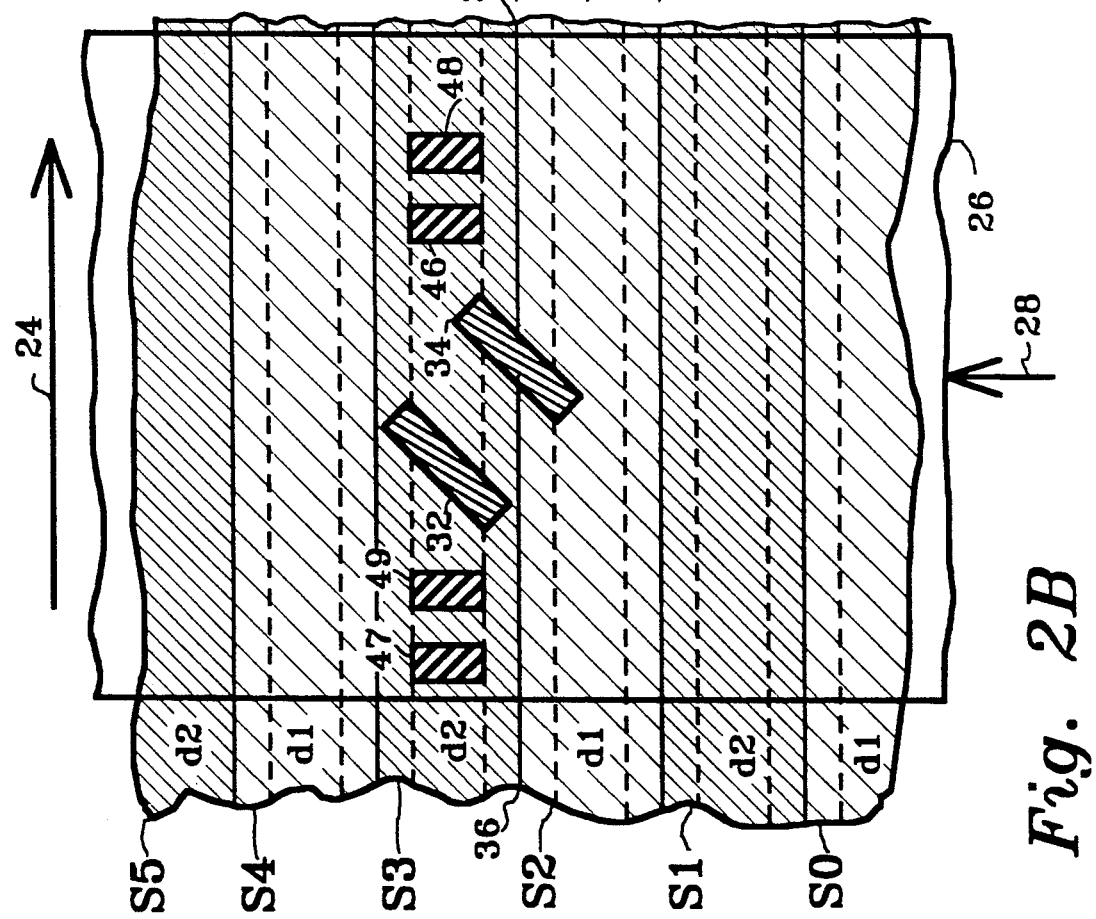

Referring now to FIGS. 2A and 2B, the operations of reading servo data and the read/write operations for information data may be combined for convenience in read/write head 26 shown in FIG. 2A with magnetic tape portion 10 moving in the forward direction, that is, from right to left as indicated by forward direction arrow 22. As will be described below in greater detail, read/write head 26 may be positioned upward or downward transverse to the direction of motion of magnetic tape portion 10 to seek the required track location. For example, as shown in FIG. 2B, read/write head 26 may be displaced upward as indicated by displacement arrow 28 when magnetic tape portion 1? is moved in the reverse direction, that is, from left to right as shown by reverse direction arrow 24.

With regard first to read/write head 26 as shown in FIG. 2A, servo data read gaps 32 and 34 are aligned at the azimuth angle to be parallel with the flux transitions in the servo data track pairs written during the servowrite process. Servo read gaps 32 and 34 are located so that their centerlines 36a and 36b, respectively, are displaced from each other, in a direction transverse to the motion of magnetic tape portion 10, by one-half the width of a servo data track. The width of each half of servo track S2 is shown in FIG. 2A as distance 'c'. As will be clear from the following discussion, each information data track is only one half or less the width of a servo data track. The width of information data track T1 is shown as distance 'c' in FIG. 2A for clarity. During forward motion, servo read gap 32 is used to track the line between a pair of servo tracks, such as centerline 36 at the border between servo track S2 and servo track S3.

As noted above with respect to FIG. 1, servo tracks S2 and S3 were written onto the underlying layer of magnetic tape portion 10 at different frequencies, so that they have different flux densities. In particular, servo track S2 has flux density d1 while servo track S3 has flux density d2. Frequencies f1 and f2 applied during the servowrite process were selected so that the resultant flux densities, d1 and d2, produce substantially similar output voltages as well as different frequencies when detected by the appropriate servo read gap, such as servo read gap 32. Frequencies f1 and f2 are different in order to be separable during filtering, but the amplitudes of the resulting read gap output voltages are substantially similar.

Figure 6:
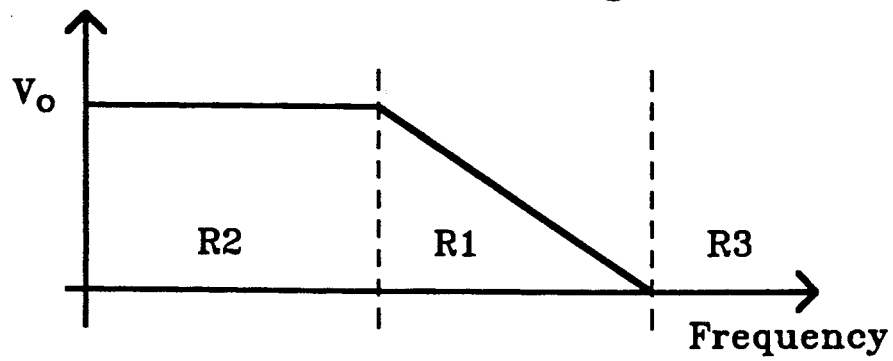
FIG. 6 is a graph of output voltage as a function of flux density.

As shown in FIG. 6, read gap voltage is roughly the same for relatively low densities, but begins to decline as tape flux density increases. Frequencies f1 and f2 may be selected from range R1 in which the output voltage $V_o$ is declining with increasing flux density so that harmonics of f1 and f2 are suppressed. The read gap output voltage resulting from the reading of flux density d1 is substantially similar to the read gap output voltage resulting from the reading of flux density d2.

Alternatively, frequencies f1 and f2 may be selected from within range R2 in which output voltage $V_o$ is relatively constant with increasing flux density. In this alternate approach, however, the presence of harmonics would require the use of more expensive techniques such as notch filtering to separate signals related to frequencies f1 and f2.

Selection of frequencies from within range R1 suppresses harmonics which allows wider bandwidth filtering and permits the system to tolerate some speed variations. Servo data densities can approach information data densities for best separation between information and servo data. However, the relatively shorter wavelength signals are harder to recover from great distances so it may be more difficult for the servo gap to recover the servo data. In addition, a calibration cycle for resolution calibration is required before servoing.

Selection of frequencies from range R2 advantageously permits easier recovery of servo data by the servo gap and a calibration cycle is not required. However, this approach generates harmonics which require narrower bandwidth filtering and servo data may be detected by the information read head if the density is too low.

When servo read gap 32 is positioned as shown in FIG. 2A at centerline 36 at the border between servo tracks S2 and S3, the output of servo read gap 32 is the superposition of the amplitudes from servo tracks S2 and S3. If read/write head 26 moves off-track, so that the gap is positioned more over servo track S2 than servo track S3, substantially more than half the signal will be received from servo track S2. The change in the output of read/write head 26 resulting from the off-track position of servo read head 32 is then used in a feedback or servo loop (not shown) to reposition read/write head 26 so that it more accurately straddles centerline 36. There are at least two convenient ways in which the error signal indicating the magnitude of the off-track error may be detected.

If flux densities d1 and d2 are relatively close to each other, and lie in the declining region of the amplitude versus density relationship of the read gap and magnetic media combination being used as noted above, then the output of servo read gap 32 for each density would be sinusoidal, and non-harmonic, assuming the servo head was positioned fully over servo track S2 or S3. The output resulting from servo track 82 would therefore be proportional to the output resulting from servo track S3. This proportionality is known as the resolution of servo read gap 32. The resolution is therefore a function of the densities and head used and may be determined during a calibration process, after servowriting, before attempting servo operation of the drive.

For example, if the ratio of the outputs of servo read gap 32, positioned in one instance directly over servo track S2 and in a second instance directly over servo track S3, was 0.8, then the correction factor for this tape/head system would be 0.8. Whenever the measured ratio in the output of servo read head 32 varied from the 0.8 correction factor measured during calibration, read/write head 26 would be off-track. Servoing read/write head 26 to reposition it on centerline 36 would be required and could be performed by means of a conventional servo loop, not shown, using the difference between the measured ratio and the correction factor determined during calibration.

In this manner it can be seen that servo read gap 32 can be used to read the servo data in servo tracks S2 and S3 to maintain the position of read/write head 26 at the forward on-track location. Read/write head 26 includes a plurality of information data read and write gaps, such as information read gaps 46 and 47 and information write gap 48 and 49 all aligned normal to the direction of tape motion as indicated by forward direction arrow 22. The center lines of information read gaps 46 and 47 and information write gaps 48 and 49, are all located at the same track position as the centerline of servo read gap 32 so that when servo read gap 32 is at the on-track location on centerline 36 as shown in FIG. 2A, information read and write gaps 46, 47, 48 and 49 are also on-track on centerline 36. The area covered by information read and write gaps 46, 47, 48 and 49 is therefore an information data track, shown in FIG. 2A as information data track T4. For clarity, the flux transitions in the information data tracks, which are all normal to forward direction arrow 22, are not shown.

It should be noted that servo tracks S2 and S3 are advantageously substantially wider than information data track T4. In particular, the servo data tracks are twice as wide, or more, as the information data tracks depicted in this embodiment.

The increased width of the servo data tracks relative to the information data tracks is important, because the width of buried servo data tracks may be a limiting factor in increasing the information storage density of the storage media. As information data storage density in a particular storage media configuration is increased, the track density is also usually increased, reducing the width available for each information data track and therefore for each servo data track. However, the output signal detected by the servo read gap, such as gap 32, is a function of the width of the servo track so that a limit may be reached in which the storage density cannot be further increased because the servo gap output signal would be reduced below the minimum required for acceptable operation. In accordance with the present invention, the fact that the servo data tracks are substantially wider than the information data tracks permits the information data storage density to be increased, for a given required minimum servo gap output signal, more than would otherwise be possible if the servo track was not wider than the information data track.

In addition to information read and write gaps 46, 47, 48 and 49, read/write head 26 may also include several other pairs of information read and write gaps positioned in line at the same track location. Each pair of information read and write gaps is spaced apart from the other pairs as required to optimize seek times and data transfer rates while operating within mechanical tolerance limits.

In operation, in the embodiment shown in FIG. 2A, servo read gap 32 reads the servo data in servo tracks S2 and S3 to maintain read/write head 26 aligned at the on-track location above centerline 36 therebetween so that information read and write gaps 46, 47, 48 and 49 are properly aligned with information data track T4 when magnetic tape portion 10 is moved in the direction indicated by forward direction arrow 22. The information data is aligned normal to forward direction arrow 22 while the servo data is at an azimuth angle of 45° thereto so that the information and servo data are easily distinguished.

In operation in another mode, such as in the reverse tape direction as indicated by reverse direction arrow 24 shown in FIG. 2B, servo read gap 34 reads the servo data from servo tracks S2 and S3 so that information read and write gaps 46, 47, 48 and 49 are aligned with information data track T5. Read/write head 26 as shown in FIG. 2B has been displaced relative to its position in Fig. 2A by an amount indicated by displacement arrow 28, so that servo read gap 34 is at the on-track position, straddling centerline 36. The present invention may be used in other formats and is not intended to be restricted to the forward-reverse format shown.

The displacement between the centerlines of servo read gap 32 and servo read gap 34 is exactly one-half the width of each servo data track so that, when servo read gap 34 is at the on-track location as shown in FIG. 2B, information read and write gaps 46, 47, 48 and 49 are displaced normal to the path of magnetic tape portion 10 by one track width relative to their position as shown in FIG. 2A, as indicated by displacement arrow 28.

In operation of a servo positioning loop to position read/write head 26, it is very desirable for the position feedback signal produced by reading the servo tracks to be linear, especially in the region of the on-track location. This permits the use of classical servo analysis techniques for servoing the read/write heads to maintain the on-track location above the border between servo data track pairs. FIG. 3 illustrates the linearity of the relationship between the servo signal output from servo read gaps 32 and 34 at different on- and off-track positions and the servo and information data track configuration of magnetic tape portion 10.

Referring now to FIG. 3, magnetic tape portion 10 is illustrated in cross section and shows information data tracks T2, T3, T4, T5, T6 and T7 in upper information data layer 54 and servo tracks S2, S3 and S4 in underlying or buried servo layer 56. As noted above, each servo data track is two information data track pitches wide, providing a stronger servo position signal. In particular, one half of information data tracks T2 and T4 overlap servo track S2 while information data track T3 is positioned directly above the center of servo track S2.

In the forward tape direction, when servo read gap 32 is in the position indicated in FIG. 3 as servo gap position 32A, a substantial output voltage is produced from servo track S2 but not from servo track S3 because servo read gap 32 is positioned substantially above servo track S2 and very little, if any, of servo read head 32 is positioned above servo track S3. This is indicated in the graph at the bottom of FIG. 3 which illustrates servo signal outputs 57 and 58, from servo tracks S2 and S3, respectively, as functions of the servo read gap position. The total output signal from servo read head 32 is the superposition of the output signals from each servo track being straddled so that, in servo head positions 32A, 32B and 32C for example, the output of servo read head 32 is the sum of servo signal outputs 57 and 58. At servo gap position 32A, servo signal output 57 from servo track S2 is near its maximum while servo signal output 58 from servo track S3 is almost zero. At servo gap position 32B, the on-track location, one half of servo read gap 32 is above servo track S2 and one half is above servo track S3 so that servo signal outputs 57 and 58 are both 50% of their maximum values and contribute equally to the total output from servo read head 32. It should be noted that in servo gap position 32B, servo read gap 32 straddles centerline 36 in the on-track position so that information read gap 46 and information write gap 48 are properly aligned with information data track T4 as indicated in the figure.

At servo gap positions 32C and 32D, servo read gap 32 is directly above servo track S3 so that the contribution to the total output of servo read head 32 from servo signal output 57 is essentially zero while the contribution from servo signal output 58 is maximum. Servo read gap 32 is preferably slightly narrower than equal width servo tracks S2 and S3 so that servo signal output 57 displays a broad flat top in region 61 where servo read head 32 is in the approximate center of servo track S2 while servo signal output 58 displays a broad flat top in region 60 where servo read head 32 is in the approximate center of servo track S3. If servo read gap 32 were as wide as servo tracks S2 or S3, regions 60 and 61 would be reduced to a sharp point making initial calibration of the system much more difficult. The advantage of the broad flat region in region 60 is to allow a servo head to be positioned at servo head position 320 for servo track S3, for example, with some tolerance so as to determine the resolution as described above in the example in which the correction factor was 0.8.

In either event, it is the linearity of the shape of servo signal outputs 57 and 58 in the vicinity of the on-track location at centerline 36 that is important for the servoing operations used to maintain servo read gap 32 on track. In all of these positions as servo read head 32 is displaced along magnetic tape portion lo from servo track S2 towards servo track S3, the contribution to the total output from servo read head 32 from servo track S3, shown as servo signal output 58, increases linearly except in region 60 while the contribution from servo signal output 57 decreases linearly except in region 61.

In a similar manner in the reverse tape direction, when servo read gap 34 is in the position indicated in FIG. 3 as servo gap position 34A, very little output voltage is produced from servo track S3 because very little, if any, of servo read gap 34 is positioned above servo track S3. This is also indicated in the same graph at the bottom of FIG. 3 as servo signal output 58 which is the same for servo read gap 34 in the reverse direction as it is for servo read gap 32 in the forward tape direction.

At servo gap position 34A, S3 servo signal output 58 output is almost zero. At servo gap position 34B, the on-track location, one half of servo read gap 34 is above servo track S3 so that servo signal output 58 is 50% of the maximum available servo signal output from servo track S3. It should be noted that in servo gap position 34B, servo read gap 34 straddles centerline 36 so that information read gap 46 and information write gap 48 are properly aligned with information data track T5 as indicated in the figure.

At servo gap positions 34C and 34D, servo read head 32 is directly above servo track S3 so that servo signal output 58 is maximum. The shape of servo signal output 58 in the vicinity of the on-track location at centerline 36 is linear at 50% of the maximum. Servo read heads 32 and 34 could not, of course, be at positions 32B and 34B at the same time.

Figure 4:
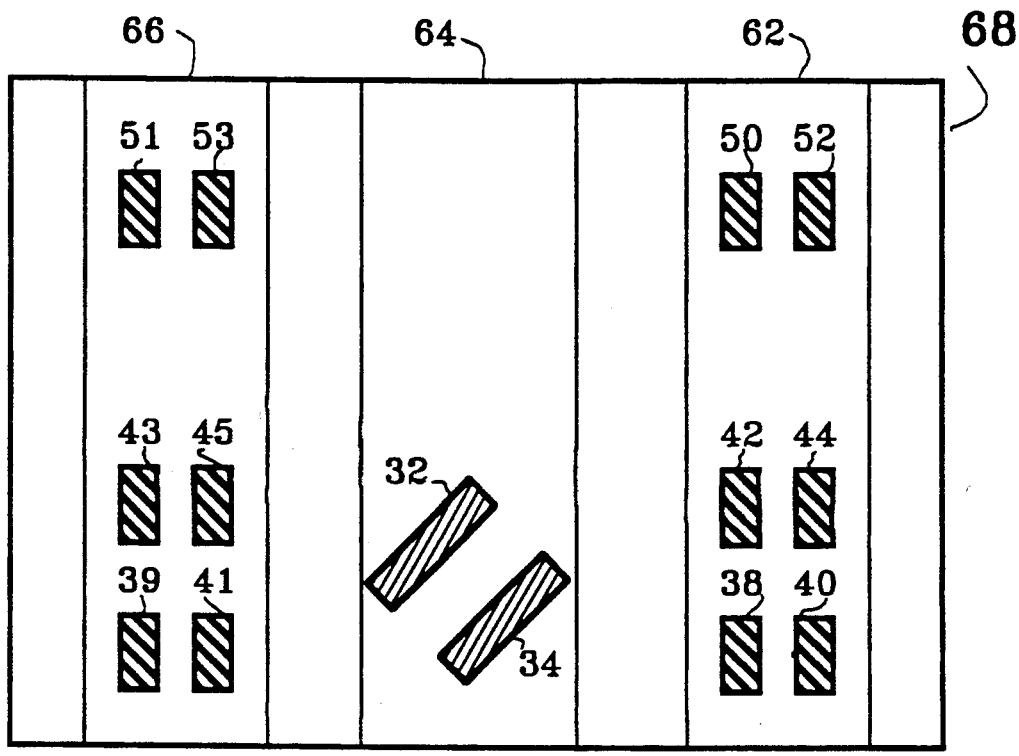
FIG. 4 is a plan view of a servo and information data read/write head in accordance with the present invention.
Figure 5:
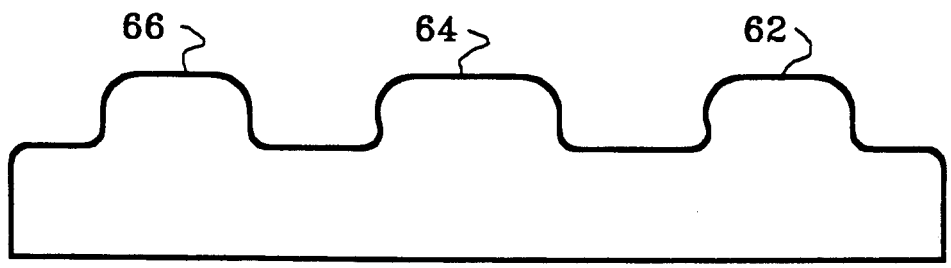
FIG. 5 is a side view of the read/write head shown in FIG. 4.

Referring now to FIGS. 4 and 5, plan and side views, respectively, are shown for read/write head 68, a preferred embodiment of read/write head 26. Servo read gaps 32 and 34 are generally in the center of read/write head 68 positioned in raised area 64 while information data read and write gap pairs 48, 40, and 42, 44, and 50, 52 are all positioned along the right hand edge of read/write head 68 in raised area 62. In addition, a duplicate set of information data read and write gap pairs 39, 41, and 43, 45, and 51, 53 are positioned in raised area 66, which is located the same distance to the left of raised area 64 as raised area 62 is to the right of raised area 64. The gap pairs are configured from thin film inductive write gaps and magneto-resistive read gaps mounted in the same bump or raised area, such as raised area 64.

In this embodiment, the left hand write gaps work with the right hand read gaps. For example, read gap 38 works in conjunction with write gap 39 while read gap 41 works in conjunction with write gap 40. This concept of combining two gaps on one bump or raised area was proposed by Applied Magnetics Corp. at the recent Quarter Inch Cartridge Committee held in San Diego.

While this invention has been described with reference to its presently preferred embodiment(s), its scope is not limited thereto. Rather, such scope is only limited insofar as defined by the following set of claims and all equivalents thereof.

What is claimed is:

1. A method of operating data storage media, comprising the steps of:
   writing a plurality of pairs of equal width tracks of servo data in a first layer of the storage media, each track of a pair containing different servo data than the other;
   moving the storage media in a first direction parallel with the plurality of said pair of tracks of servo data;
   mounting an information read or write gap, a first servo data gap and a second servo data read gap in fixed positions on a read or write head, the second servo data read gap being displaced from the first servo data read gap transverse to the first direction by a distance equal to one half the width of a track of servo data;
   positioning the read or write head by locating the first servo data read gap at an on-track location at which there is a predetermined relationship between the servo data read from each track of a pair;
   creating a first information data track in a second layer of the storage media with the information data read or write gap; then
   moving the storage media in a second direction opposite the first direction;
   positioning the read or write head by locating the second servo data read gap at the on-track location; and
   creating a second information data track with the information data read or write head, said second information data track being displaced from said first information data track by a distance equal to one half the width of a track of servo data.

2. The method of claim 1 wherein the step of writing the plurality of pairs of tracks of servo data further comprises the step of:
   aligning the servo data and servo data read gap at a substantial azimuth angle to the information data read or write gap.

3. The method of claim 1 further comprising the steps of:
   mounting an additional information read or write gap in fixed position on the read or write head displaced from the first information data read or write gap servo data read gap by a distance equal to a multiple of the width of a track of servo data; and
   creating additional information data tracks in the second layer of the storage media with the additional information data read or write gap.

4. The method of claim 1 further comprising the preliminary step of:
   selecting a relationship between the servo data to be written in each track of the servo data track pair so that the difference between the servo data read from the track pair at an off-track location displaced from the on-track location is substantially linearly related to the magnitude of the displacement.

5. A data storage system comprising:
   data storage media having a second layer and a first layer underlying the second layer;
   means for writing pairs of servo data tracks in the first layer, each track containing different servo data than the other track of the pair;
   a first servo data read gap positionable at an on-track location, said on-track location being located above a pair of servo data tracks at a location at which there is a predetermined relationship between the servo data read from each track of the pair;
   a second servo data read gap positionable at the on-track location, said second servo data read gap coupled to said first servo data read gap and displaced therefrom by a fixed distance; and
   means coupled to said first and second data read gaps for creating a first information data track in the second layer above the servo data track pair in accordance with the positioning of the first servo data read gap at the on-track location and for creating a second information data track in the second layer in accordance with the positioning of the second servo data read gap at said on-track location, said second information track being displaced from said first information track by said fixed distance.

6. The system of claim 5 wherein the means for writing servo data track pairs further comprises:
   means for aligning the servo data and servo data read gap at a substantial angle to the first and second information data tracks to reduce interaction therebetween.

7. The system of claim 5 wherein the relationship between the servo data to be written in each track of the servo data track pair is selected so that the difference between the servo data read from the track pair at an off-track location displaced from the on-track location is substantially linearly related to the magnitude of the displacement.

8. The method of storing and retrieving information data in a magnetic data storage media having an upper and an underlying layer, comprising the steps of:
   formatting the underlying layer with pairs of equal width servo data tracks, each track having either a first or a second flux density stored therein;
   reading the servo data tracks with a first servo read head in a forward direction to locate an on-track location at which the servo data read from each track in a pair of tracks has a predetermined relationship with the data from the other track in the pair;
   reading the servo data tracks with a second servo read head in a reverse direction to locate the same on-track location, said first and second servo read heads displaced from each other by one half of the width of a servo data track;
   creating a first plurality of equal width information data tracks on the upper layer in accordance with the on-track location in the forward direction;
   creating a second plurality of information data tracks on the upper layer in accordance with the on-track location in the reverse direction, said second plurality of information data tracks being interleaved with said first plurality; and positioning a plurality of information data read or write heads in a fixed relationship to the first and second servo read heads to write data to and read data from the first plurality of information data tracks int h forward direction and the second plurality of information data tracks in the reverse direction.

9. The method of claim 8 wherein the information data is stored in the information data tracks in a first orientation and the servo data is stored in the servo data tracks at a substantially different orientation to reduce the interaction between the servo and information data when read.

10. The method of storing and retrieving information data on magnetic tape, comprising the steps of:

formatting a buried servo layer in the magnetic tape with servo data flux density transitions oriented at a substantial angle relative to the direction of tape motion, the flux density transitions being contained in a plurality of equal width servo data tracks where the servo data in every other track has a first flux density and the servo data in the other tracks has a second flux density;

reading the servo data tracks with a first servo read gap in a read or write head when the magnetic tape moves in a forward direction to determine a forward on-track position for the read or write head at a border between a pair of servo data tracks at which the servo data read from one servo data track has a predetermined relationship with the servo data read from the other servo data track;

selecting the first and second flux densities so that the difference between output signals read by the first servo data read gap from each servo data track adjacent the track pair border is a linear function of the displacement of the read or write head from the border;

positioning a plurality of information data read or write gaps in the read or write head to write data to and read data from a first plurality of information data tracks on an upper, lower coercivity layer of the magnetic tape in accordance with the forward on-track position of the read or write head, the width of each such information data track being less than one half the width of a servo data track and having information data normal to the direction of tape motion to minimize interaction with the servo tape data;

reading the servo data tracks with a second servo read gap in the read or write head when the magnetic tape moves in a reverse direction to determine a reverse on-track location, the second servo gap being displaced in the read or write head from the first servo gap normal to the tape motion by the width of an information data track pitch;

positioning the read or write head in accordance with the reverse on-track position to write data to and read data from a second plurality of information data tracks on the upper layer, each such information data track having the same width, and being interspersed between, the first plurality of information data tracks.

11. A system for storing and retrieving information data on magnetic tape, comprising:

an upper information data layer and a higher coercivity, underlying buried servo data layer on the magnetic tape;

a full width servo data write gap operating at a first frequency for writing servo data on the lower layer, said servo data having a first flux density and oriented at a substantial angle relative to the direction of tape motion;

a plurality of equal width servo track write gaps positioned in a gapline parallel to the full width servo data write gap, said gaps being spaced apart along the gapline by their width and operated at a second frequency for overwriting portions of the first density flux transitions on the lower layer with flux transitions of a second density to form a plurality of pairs of servo tracks on the lower second layer, one track of a pair containing servo data at the first density and the other track of the pair containing servo data at the second density;

a read or write head;

a forward servo read gap in the read or write head operable when the magnetic tape moves in a forward direction to determine a forward on-track position for the read or write head related to a border between a pair of servo data tracks at which the servo data read from one servo data track has a predetermined relationship with the servo data read from the other servo data track, the first and second frequencies having been selected so that the difference between output signals read by the forward servo data read gap from each servo data track adjacent the track pair border is a linear function of the displacement of the read or write head from the border;

a reverse servo read gap in the read or write head operable when the magnetic tape moves in a reverse direction to determine a reverse on-track position for the read or write head related to the border between the pair of servo data tracks, the reverse servo read gap being displaced from the forward servo read gap normal to the tape motion by one half the width of a servo data track;

a plurality of information data read or write gaps positioned in the read or write head and aligned normal to the tape motion in a predetermined relationship with the forward and reverse servo read gaps for writing information data to and reading information data from a first plurality of information data tracks in the forward direction and a second plurality of information data tracks, interspersed with the first plurality, in the reverse direction.

* * * * *

UNITED STATES PATENT AND TRADEMARK OFFICE
CERTIFICATE OF CORRECTION

Page 1 of 2

PATENT NO. : 5,291,348
DATED : March 1, 1994
INVENTOR(S) : Clement R. Copolillo

It is certified that error appears in the above-indentified patent and that said Letters Patent is hereby corrected as shown below:

Col. 3, line 15, after "45" insert --°--.

Col. 4, line 18, delete "12" and insert --10--.

Col. 5, line 40, delete "82" and insert --S2--.

Col. 8, line 10, delete "320" and insert --32C--.

Col. 8, line 19, delete "1o" and insert --10--.

Col. 8, line 57, delete "48" and insert --38--.

Col. 9, line 22, after first occurrence of "data" insert --read--.

Col. 11, line 5, delete "int h" and insert --in the--.

UNITED STATES PATENT AND TRADEMARK OFFICE
CERTIFICATE OF CORRECTION

PATENT NO. : 5,291,348
DATED : March 1, 1994
INVENTOR(S) : Clement R. Copolillo

It is certified that error appears in the above-indentified patent and that said Letters Patent is hereby corrected as shown below:

Col. 12, line 9, delete "operating" and insert --operated--.

Signed and Sealed this

Nineteenth Day of July, 1994

*Attest:*

BRUCE LEHMAN

*Attesting Officer*     *Commissioner of Patents and Trademarks*